Nov. 16, 1943.  E. J. W. EGGER ET AL  2,334,257
METHOD OF MAKING BLOWPIPE NOZZLES
Original Filed Jan. 14, 1939
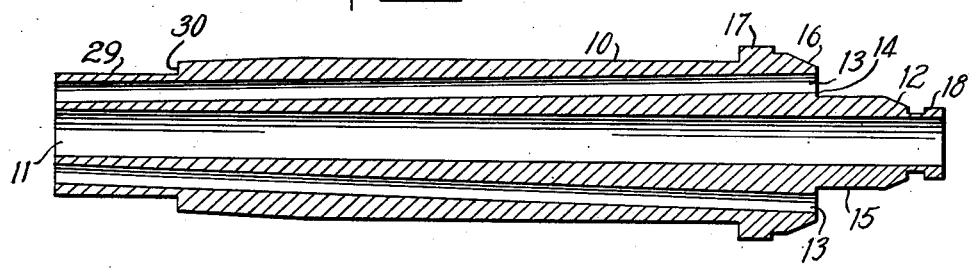
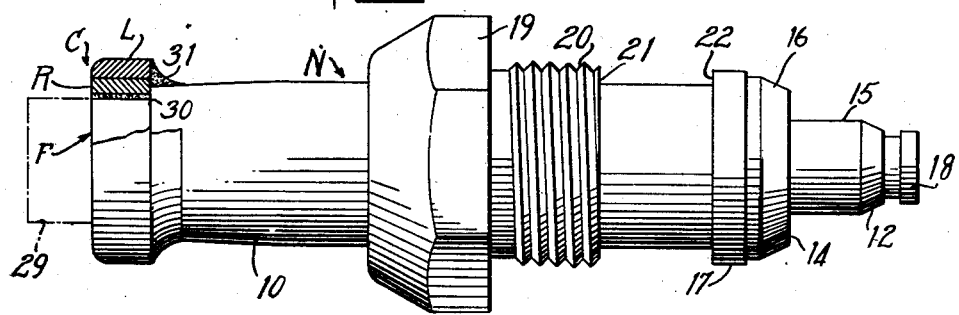
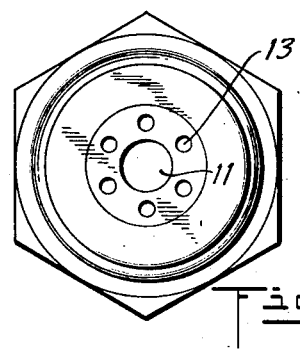
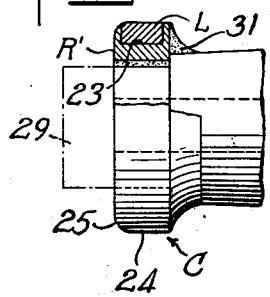
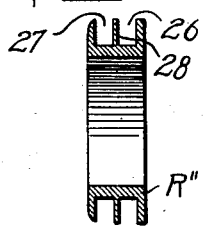
INVENTORS
EDUARD J. W. EGGER
CASIMIR V. JOHANSON
RAY B. SMITH
BY *[signature]*
ATTORNEY Patented Nov. 16, 1943

2,334,257

UNITED STATES PATENT OFFICE 2,334,257

METHOD OF MAKING BLOWPIPE NOZZLES

Eduard J. W. Egger, Bellevue, Pa., Casimir V. Johanson, Cranford, N. J., and Ray B. Smith, Pittsburgh, Pa., assignors to The Linde Air Products Company, a corporation of Ohio Original application January 14, 1939, Serial No. 250,890. Divided and this application April 3, 1941, Serial No. 386,634

6 Claims. (Cl. 29—157)

This invention relates to blowpipe nozzles the forward ends of which normally engage and are guided by a metal surface being acted upon by the gas stream discharging from said nozzles, and particularly to a method of making such nozzles.

In certain metal-working operations, e. g., when deseaming steel billets and the like, the work surface is preheated to the ignition temperature and a relatively low-velocity large-volume oxidizing gas jet is applied obliquely against successive portions of the metal surface so preheated, to remove metal from or deseam said surface. Nozzles employed for this purpose usually include a relatively large diameter oxygen passage extending along or parallel with the axial center line of the nozzle, and a series of relatively small diameter preheating gas passages parallel with the large oxygen passage or converging towards the forward end of the nozzle, and usually, but not necessarily, spaced circumferentially about the large oxygen passage. The nozzle is held so that its axis is oblique and makes a sharp angle with the surface of the workpiece and the nozzle is guided by and pushed along the workpiece in the direction of the issuing oxidizing gas stream, thus wearing away the front periphery and the peripheral portions behind the front face of the nozzle body and exerting a rearward thrust against the latter. Such guidance of the nozzle by contacting its end with the metal surface is especially desirable when hand-operated deseaming blowpipes are moved along the surface to be deseamed because the preheating and oxidizing jets may then be maintained in accurate positions with respect to the work surface during relative movement, irrespective of the surface contour of the work—thus uniform removal of metal along the surface can be accomplished.

Rapid wear and deterioration will occur at the periphery of the nozzle adjacent but behind its front face when such periphery continually engages the surface of a workpiece to guide the nozzle while held obliquely against the workpiece, especially during a deseaming or other thermochemical operation, because of the intense heat adjacent the nozzle and in contact with the work.

An object of this invention is to provide a novel method of making a blowpipe nozzle of economical construction having a peripheral portion surrounding and extending a substantial distance beyond the periphery of the nozzle body which serves to accurately space the discharge end of the nozzle from the work surface, and which peripheral portion will resist abrasion, deformation and oxidation at extremely high temperatures.

Other objects of this invention are to provide a method of making a blowpipe nozzle having a peripheral work-contacting portion adjacent but behind its front face which peripheral portion extends a substantial distance beyond the periphery of the nozzle body and comprises metal resistant to abrasion, deformation and oxidation at high temperatures; a method of assembling a nozzle in which a layer or ring of abrasive-resistant and oxidizing-resistant material is firmly secured to the periphery of the nozzle, which nozzle is formed from metal having a substantially lower melting point than said resistant material; a process of making a nozzle in which a layer of metal resistant to oxidation and abrasion at high temperatures is deposited on a ring of relatively inexpensive metal which is also resistant to oxidation at high temperatures, thus forming a composite collar which latter is firmly but removably secured to the nozzle body by brazing; and a method of making an improved nozzle which includes steps in the manufacture thereof for preventing the contamination, clogging, distortion, or in otherwise objectionably affecting the gas passages in the nozzle during the brazing operation.

A further object of the invention is to provide a novel method of making a blowpipe nozzle having a coupling nut loosely mounted thereon and non-detachable therefrom.

The above and other objects and novel features of the invention will become apparent from the following specification and the accompanying drawing, in which:

Fig. 1 is a longitudinal central sectional view of a nozzle blank to which the principles of this invention are applicable;

Fig. 2 is a plan view, partially in section, showing a blowpipe nozzle to which the principles of this invention have been applied;

Fig. 3 is a front end elevation of the blowpipe nozzle shown in Fig. 2;

Fig. 4 is a view of the forward portion of a nozzle showing a different form of the invention; and Fig. 5 is a view of a modified element of the invention.

In accordance with the invention there is provided a method of making a blowpipe nozzle which comprises forming a substantially cylindrical metal body having gas passages extending therethrough, coating the outer surface portion of the body with a welding flux, mounting a metallic collar on the body behind but adjacent to one end thereof, the internal diameter of the collar providing a slight capillary clearance between the collar and the body, and depositing weld metal between the collar and the body whereby the slight capillary clearance between the collar and the body is filled with weld material by capillary attraction.

According to the invention there is also provided in the art of making deseaming nozzles, a process of uniting a relatively short and thick protective ring comprising a hard metal, such as "Stellite" alloy, to a tubular deseaming nozzle body of relatively soft metal, such as copper, which comprises forming the inner annular surface of the ring to fit around the annular surface of the body adjacent the outer end thereof, and welding the ring in place on the body with a suitable flux and weld metal, such as bronze or silver solder, substantially throughout an annular portion of said inner and outer annular surfaces.

Further, according to the invention, a nozzle body is first formed having at least one gas passage extending longitudinally therethrough, a seating surface adjacent the inlet end of said passage, and an external shoulder adjacent said seating surface. An annular coupling nut having a smaller internal diameter than an outer dimension of said shoulder is then telescoped onto the nozzle body so formed. Finally, an annular member of wear resistant metal having a greater outside diameter than the internal diameter of the coupling nut is permanently secured to a part, preferably an annular portion of reduced diameter, of the outer longitudinal surface of the nozzle body around the discharge end of the gas passage. A blowpipe nozzle, is thus provided having a coupling nut loosely mounted thereon and non-detachable therefrom.

Referring to Fig. 2, there is shown a deseaming nozzle N having a forward portion of reduced diameter adapted to receive a collar C adjacent to but behind the front face of the nozzle. The collar C preferably extends beyond the periphery of the nozzle N and includes a ring R made from metal which is resistant to oxidation, cracking or spalling at the high temperatures, such as the nickel-copper alloys containing approximately 70 percent nickel and 30 percent copper—commonly known as Monel metal; or such a metal as the high chromium or chromium-nickel steels, usually containing 10 percent to 25 percent chromium. The collar C also may include a layer L of a metal alloy including 35 percent to 90 percent of metal from the group consisting of chromium, molybdenum and tungsten, the remainder principally comprising metal from the group consisting of iron, nickel and cobalt, which alloy, at high temperatures, is resistant to abrasion, deformation and oxidation. The alloy L is deposited on and permanently bonded to the outer periphery of the ring R.

Referring to Figs. 1 and 2, the blank from which nozzle N is formed comprises a substantially cylindrical body 10 of metal such as copper. It is provided with a relatively large central passage 11, which extends throughout the length of the nozzle for conveying oxygen therethrough. The rear end of the tubular body 10 is provided with a seating surface or seat 12 surrounding the entrance end of the passage 11. The seat 12 is adapted to form a hermetical seal with a complementary seat in a socket in the blowpipe head to which the nozzle is adapted to be connected. Oxidizing gas is adapted to flow from the blowpipe head into the passage 11, from which it discharges onto the work being treated. A series of preheat or combustible gas passages 13 are arranged in parallel relation about the central passage 11. The rear ends or inlets of these passages terminate in an annular surface 14 which is spaced forwardly of the inlet end of passage 11. The surface 14 and the adjoining cylindrical surface 15 form a gas-distributing chamber with a portion of the blowpipe head. A seating surface or seat 16 surrounds the surface 14 and the inlets of the preheat passages 13 and forms a hermetical seal with a complementary seat in the socket of the blowpipe head. A combustible gas, such as a mixture of oxygen and acetylene, is fed to said gas-distributing chamber, thence through the preheat passages 13, and finally the gas mixture discharges from the outlets of said passages in the front face F of the nozzle N, to provide an annular row of preheating flames An integral annular enlargement or shoulder 17 is provided close to and forwardly of the seat 16, and is of such outer diameter that it cooperates with an integral collar 18 located at the extreme rear end of the nozzle N to provide means for protecting the seats 12 and 16 when the nozzle N is dropped while it is separated from the blowpipe.

Referring to Fig. 2, the nozzle N is provided with a hollow coupling nut 19 having screw threads 20 adapted to cooperate with complementary threads in the socket of the blowpipe head to which the nozzle is to be secured. The nut is rotatable and slidable axially relatively to and upon the outside surface of the nozzle N when coupling the nozzle to the blowpipe head, thus permitting any circumferential portion of the collar C to be located in work-contacting position and thereby affording a longer life for the nozzle, since the wear-resistant collar may then be adjusted so that it wears off evenly throughout its circumference. While coupling the nozzle to a blowpipe head, an end 21 of the nut bears against the surface 22 of the shoulder 17. Furthermore, the abutments provided by the collar C and the shoulder 17 prevent removal of the nut 19 from the nozzle but permit sliding and rotation of the nut relatively to the nozzle.

The layer of material L should preferably comprise metals such as alloys of cobalt, chromium, and tungsten, because metals in this class are resistant to both oxidation and abrasion at extremely high temperatures. These metals are commonly known to the trade as "Stellite" alloys. The invention, however, is not limited to such specific alloys but covers all such materials capable of simultaneously withstanding abrasive wear and oxidation at a high temperature.

Alloys containing cobalt, chromium and tungsten are extremely difficult to work, and casting is the only commercial method of making rings therefrom. These cast rings are extremely brittle and will crack, spall and chip when subjected to substantial temperature variations, or impacts due to handling unless an excellent bond of sufficient extent is formed between the alloy and the metal to which it is to be joined.

It has been found that only a relatively thin layer of an abrasive resistant metal such as "Stellite" alloy need be employed to adequately protect the nozzle. However, the melting point of such an alloy is much higher than that of copper, or the metal from which the nozzle N is made, which metal is necessarily one of high heat conductivity in order to avoid local overheating or burning. It is undesirable and impractical to deposit a thin homogeneous coating of such an alloy on the forward end of the copper nozzle body. These metals will not mix during a fusion welding process, and if they did mix properly to form a bond, the difference between their melting points would cause a dilution of the alloy thereby materially detracting from the resistant properties of the coating. Likewise, the melting temperature of such an alloy is so high that if it were applied directly to the copper nozzle N, distortion as well as oxidation of the walls of the gas passages would occur thereby detrimentally affecting the size, alignment, and disposition of these passages within the nozzle.

It has been found that a thin layer of such an alloy L can be deposited in substantially undiluted condition on, and homogeneously bonded to, a metal support such as steel, and the latter metal then can be more readily welded or brazed directly to the copper nozzle body. Thus, a relatively thin layer of undiluted and relatively more expensive alloy which is resistant to oxidation and abrasion at high temperatures may be secured, effectively and without difficulty, to the forward end of the nozzle N by an intermediate agency such as inexpensive steel.

Inasmuch as the temperature during the deseaming or other metal-working operation is relatively high, any readily oxidizable metal used for the ring R will be subjected to scaling and burning by the oxidizing gas discharging from the end of the nozzle. Accordingly, ring R is preferably made from an inexpensive metal which is resistant to oxidation at high temperatures, such as Monel metal, or the chromium or chromium-nickel steels, usually containing 10 percent to 25 percent chromium. Furthermore, such metals have high strength; may be readily brazed or otherwise firmly united to the copper nozzle body; will not crack when subjected to substantial temperature variations; and the difficulties encountered by the cracking of thick collars of alloys containing cobalt, chromium and tungsten will be avoided. Additionally, a relatively thin layer of the alloy L is less apt to crack than a thick collar of such alloy, and even if cracks develop in the thin layer, they will be of no consequence since the entire layer is homogeneously bonded to the ring R.

The composite collar C may be formed by fusion depositing a layer of alloy L onto and covering the outer cylindrical surface of a relatively long stainless steel tube of the desired inside and outside diameters. This may be accomplished by using an oxy-acetylene flame to raise the temperature of the tube to the point where its external surface will "sweat" or become fluid superficially; and then fusion depositing, by the puddling process, the alloy L onto such "sweated" surface. The tube so coated may then be cut perpendicular to its axis into sections of appropriate length to form a number of finished pieces, each constituting a collar C.

Referring to Fig. 4, another embodiment of the invention is disclosed, wherein the collar C includes an independently formed ring R' of stainless steel having a channel 23 in its outer peripheral surface. The alloy L is then fusion deposited, as described above, within the channel 23 so that a crest 24 is formed which, upon the rounding of shoulder 25 of the collar C, will directly engage the work during a metal-working operation.

Referring to Fig. 5, another form of the invention is disclosed, wherein a ring R" is made from a nickel-copper alloy. This collar is provided with two channels, 26, 27 separated by a relatively thin web 28. The cold ring R" may be placed within a suitable mould, and the alloy L in molten state may be fed to the channels 26, 27 where it unites or thermo-chemically reacts with at least a portion of the thin web 28 and forms an excellent bond with the metal of the ring R". By virtue of the rapid transfer of heat from the molten alloy L to the cold extensive surface of the ring R" with which it contacts, the alloy L quickly freezes without an appreciable dilution of the molten metal with the metal of ring R". However, the interior of the mass of molten metal L dissolves or alloys with at least a portion of the thin web 28, which newly formed alloy provides a rigid bond between the alloy L and the metal of ring R".

In both instances where the rings R' and R" are independently formed, their external diameters are substantially larger than that which is ultimately required, since it is desirable to provide relatively deep channels within which to cast or deposit the alloy L. The composite collars C, formed from the rings R' and R" are then dressed by grinding their outer peripheries to provide the desired form.

The method of this invention comprises bronze welding or silver soldering the composite collar C to the forward end of the nozzle N in a manner to protect the discharge ends of the gas passages within said nozzle. Thus, referring to Figs. 1 and 2, the forward end of the tubular copper body 10 may be turned to a reduced diameter, as at 29, to provide a shoulder 30 against which the collar C is adapted to abut—thus the shoulder 30 resists the rearward thrust of the collar C while the latter rubs along the surface of the workpiece. The integral extension 29 is of substantially greater length than the longitudinal dimension of the collar C and the ultimate internal diameter of the collar C is slightly greater than the external diameter of the extension 29 to provide a slight capillary clearance therebetween. The collar C is set in place around the extension 29 so that one side of the collar abuts against the shoulder 30. The extension 29 is covered with a flux prior to mounting the collar C thereon, and upon assembly of the collar, a bronze fillet weld 31 is formed between its rear side and outside of the copper body 10. It has been found that the formation of the weld 31 may be facilitated by employing a phosphorus bronze welding material to start the same and completing weld 31 with ordinary bronze welding rod. During the welding of the collar C to the body 10, a portion of the weld metal 31 flows by capillarity inwardly along and past the shoulder 30 and fills the space between the extension 29 and the internal surface of the collar C, thus forming a rigid connection between the collar and the nozzle N. The flux and weld metal may flow along and downwardly over the outer end of the extension 29, thus clogging the discharge outlets of the passages 11 and 13. After the collar has been welded in place, the projecting portion of the extension 29 is cut off flush with the front face of the collar C, thus providing the finished nozzle and consequently avoiding clogging of passages 11 and 13.

From the foregoing it is apparent that a nozzle has been provided which comprises a work-contacting peripheral portion adjacent but behind the front face of the nozzle, which portion extends beyond the periphery of the nozzle body, includes a layer of material which is resistant to wear, deformation and oxidation at high temperatures permanently bonded thereto.

In deseaming operations, the blowpipe is so held that the longitudinal axis of its nozzle is obliquely inclined at a sharp angle to the surface of the steel workpiece, and the nozzle is pushed along the workpiece in the direction of the issuing oxygen stream. It will be evident that the improved composite metal collar on each of the nozzles disclosed herein projects a substantial distance outwardly beyond the adjoining periphery of the softer copper nozzle body, which construction serves (1) to amply protect all peripheral portions of the nozzle body which otherwise would deteriorate while engaging against a metal surface, and (2) to maintain the oxygen and preheating gas outlets a greater but predetermined distance away from such surface during the movement of the nozzle and its collar along and in engagement with said surface, thus achieving a more uniform efficient operation and less clogging of the gas outlets.

The nozzles disclosed herein are claimed in application Serial No. 250,890, filed January 14, 1939, patented September 1, 1942, No. 2,294,392 of which the present application is a division.

What is claimed is:

1. The method of making blowpipe nozzles of the type comprising a metal body having a front face provided with a gas outlet and a peripheral shoulder spaced behind said front face, and a composite metal collar extending circumferentially of said body behind said front face and bearing against said shoulder, said collar comprising an inner metal member and an outer protective member of wear-resistant metal united to said inner member; which method comprises casting said outer member on said inner member to make said collar; forming said body and said collar so that said body initially projects forwardly beyond said collar, and said collar projects radially of said body adjacent said shoulder; permanently uniting said collar to said body; and then removing the end portion of said body which projects forwardly beyond said collar.

2. The method of making blowpipe nozzles of the type comprising a metal body having a front face provided with a gas outlet and a peripheral shoulder spaced behind said front face, and a composite metal collar extending circumferentially of said body behind said front face and bearing against said shoulder, said collar comprising an inner metal member and an outer protective member of wear-resistant metal united to said inner member; which method comprises forming said body and said collar so that said body initially projects forwardly beyond said collar, and said collar projects radially of said body adjacent said shoulder; making an annular fillet weld in the angle formed by said collar and said body at the rear of said collar; and then removing the end portion of said body which projects forwardly beyond said collar.

3. A method of making a blowpipe nozzle which comprises forming a substantially cylindrical metal body having gas passages extending therethrough, said body also having a portion of reduced cross section adjacent one end of the body, coating the outer surface of said portion with a welding flux, mounting a metallic collar on said portion so that a part of said portion extends substantially beyond the forward end of said collar, the internal diameter of said collar providing a capillary clearance between said collar and said portion, supplying weld material between said collar and said portion whereby the capillary clearance therebetween is filled with weld material by capillary attraction, and cutting off the extended part of said portion flush with the forward end of said collar after said welding operation.

4. A method of making a blowpipe nozzle which comprises forming a substantially cylindrical metal body having gas passages extending therethrough, reducing the cross section of a portion of said body adjacent one end of the body to form a shoulder on said body behind said end, coating the outer surface of said portion with a welding flux, mounting a metallic collar on said portion in abutting relation to said shoulder and with a part of said portion extending substantially beyond the forward end of said collar, the internal diameter of said collar providing a slight clearance between said collar and said body, supplying weld material between said collar and said body and over said shoulder whereby said slight clearance is filled with weld material by capillary attraction, and cutting off the extended part of said portion flush with the forward end of said collar after said welding operation.

5. In the art of making deseaming nozzles composed of a protective ring comprising a hard metal, such as "Stellite" alloy, and a tubular deseaming nozzle body of relatively soft metal, such as copper, the process which comprises forming the inner annular surface of said ring to fit around the outer annular surface of said body with a part of the body projecting axially beyond the inner annular surface of the ring, welding said ring in place on said body with a suitable flux and weld metal, such as bronze or silver solder, substantially throughout contiguous annular portions of said inner and outer annular surfaces and cutting off said body part which projects axially beyond said ring after said welding operation to provide an end face on the nozzle which extends radially to the outer periphery of said ring.

6. The method of making a deseaming nozzle which comprises the steps of shaping the discharge end of a generally tubular nozzle body of relatively soft metal to provide a cylindrical outer surface adapted to receive a protective collar and prevent rearward movement of the collar with respect to the nozzle body; independently forming a protective collar to fit said cylindrical outer surface portion with a part of the latter projecting beyond said collar, said collar comprising a ring of metal adapted to be bronze welded to said nozzle body, such collar having an outer annular layer of metal adapted to resist abrasion; fitting said collar on said surface portion of said nozzle body, with a suitable bronze welding flux disposed therebetween, said ring having an outwardly projecting rear edge; bronze fillet welding at least the outwardly projecting rear edge of said ring to an adjoining annular surface of said body; and cutting off that part of said outer surface portion which projects beyond said collar flush with said ring, after said bronze welding step, to form the final discharge end face of the nozzle.

EDUARD J. W. EGGER.
CASIMIR V. JOHANSON.
RAY B. SMITH.

CERTIFICATE OF CORRECTION.

Patent No. 2,334,257.                                           November 16, 1943.

EDUARD J. W. EGGER, ET AL.

It is hereby certified that error appears in the printed specification of the above numbered patent requiring correction as follows: Page 4, second column, line 54, claim 6, after "surface" insert --portion--; and that the said Letters Patent should be read with this correction therein that the same may conform to the record of the case in the Patent Office.

Signed and sealed this 18th day of January, A. D. 1944.

(Seal)
Henry Van Arsdale,
Acting Commissioner of Patents.